(12) United States Patent
Zhou et al.

(10) Patent No.: US 11,496,276 B2
(45) Date of Patent: Nov. 8, 2022

(54) TECHNIQUES FOR CONFIGURING REFERENCE SIGNALS

(71) Applicant: QUALCOMM Incorporated, San Diego, CA (US)

(72) Inventors: Yan Zhou, San Diego, CA (US); Tao Luo, San Diego, CA (US); Alexandros Manolakos, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/904,401

(22) Filed: Jun. 17, 2020

(65) Prior Publication Data

US 2021/0006380 A1 Jan. 7, 2021

(30) Foreign Application Priority Data

Jul. 4, 2019 (GR) .............................. 20190100282

(51) Int. Cl.
*H04L 5/00* (2006.01)
*H04B 7/01* (2006.01)
(Continued)

(52) U.S. Cl.
CPC ............. *H04L 5/0085* (2013.01); *H04B 7/01* (2013.01); *H04B 7/0626* (2013.01);
(Continued)

(58) Field of Classification Search
CPC . H04L 5/0085; H04L 5/0051; H04L 27/2657; H04L 1/1657; H04L 5/0048;
(Continued)

(56) References Cited

U.S. PATENT DOCUMENTS

2015/0304995 A1* 10/2015 Yi ........................ H04L 27/2647
370/329
2019/0141691 A1* 5/2019 Kwon ................... H04B 7/0695
(Continued)

OTHER PUBLICATIONS

Qualcomm Incorporated: "Enhancements on Multi-beam Operation", 3GPP Draft; R1-1907290, May 13, 2019, XP051728730 Retrieved from the Internet: URL:http:/Awww.3gpp.org/ftp/Meetings%5F3GPP%5FSYNC/RAN1/Docs/R1%2D1907290%2Ezip (Year: 2019).*

(Continued)

*Primary Examiner* — Hardikkumar D Patel
(74) *Attorney, Agent, or Firm* — Danai Nelisile Mhembere; Patterson & Sheridan, LLP

(57) ABSTRACT

Certain aspects of the present disclosure provide techniques for configuring reference signals. A method that may be performed by a user equipment (UE) includes receiving a control message indicating a first quasi co-location (QCL) for an aperiodic-tracking reference signal (A-TRS), the A-TRS being associated with a periodic-tracking reference signal (P-TRS), determining a second QCL for the P-TRS based on the first QCL for the A-TRS, setting a receive beam for reception of the P-TRS based on the second QCL of the P-TRS, and decoding one or more frames based on channel statistics estimated via the P-TRS received via the receive beam.

26 Claims, 8 Drawing Sheets

(51) Int. Cl.
*H04W 72/04* (2009.01)
*H04B 7/06* (2006.01)
*H04W 56/00* (2009.01)

(52) U.S. Cl.
CPC ......... *H04B 7/0695* (2013.01); *H04L 5/0051* (2013.01); *H04W 56/001* (2013.01); *H04W 72/042* (2013.01); *H04W 72/046* (2013.01); *H04W 72/0493* (2013.01)

(58) Field of Classification Search
CPC ... H04L 25/0224; H04L 5/0098; H04L 5/001; H04L 5/0096; H04L 5/0023; H04L 27/2602; H04L 5/00; H04B 7/01; H04B 7/0626; H04B 7/0695; H04B 7/06; H04B 17/373; H04B 7/088; H04B 7/0408; H04W 56/001; H04W 72/042; H04W 72/046; H04W 72/0493; H04W 28/20; H04W 48/08; H04W 64/003; H04W 72/0453; H04W 72/12
See application file for complete search history.

(56) References Cited

U.S. PATENT DOCUMENTS

2019/0296956 A1* 9/2019 John Wilson ......... H04L 5/0048
2019/0305830 A1* 10/2019 Zhou ..................... H04L 1/1664
2019/0356444 A1* 11/2019 Noh ...................... H04L 5/0023
2020/0403748 A1* 12/2020 Yokomakura ......... H04L 5/0051
2021/0044401 A1* 2/2021 Yoon .................. H04W 72/042

OTHER PUBLICATIONS

Ericsson: "On DL Signalling Reduction", 3GPP Draft, 3GPP TSG-RAN WG1 Meeting #95, R1-1813608 On DL Signalling Reduction, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555664, 3 Pages, Retrieved from the Internet: URL: http://www.3gpp.org/ftp/Meetings%5F3GPP%5FSYNC/RAN1/DOCS/R1%2D1813608%2Ezip, [retrieved on Nov. 11, 2018], Section 2.

International Search Report and Written Opinion—PCTIUS2020/038532—ISAEPO—dated Sep. 18, 2020.

Qualcomm Incorporated: "Enhancements on Muit-beam Operation", 3GPP Draft, 3GPP TSG-Ran WG1 Meeting #97, R1-1907290 Enhancements on Multi-beam Operation, 3rd Generation Partnership Project (3GPP), Mobile Competence Centre, 650, Route Des Lucioles, F-06921 Sophia-Anti Polis Cedex, France, vol. RAN WG1, No. Renot USA May 13, 2019-May 15, 2019, May 13, 2019 (May 13, 2019), XP051728730,26 pages. Retrieved from the Internet URL: http://www.3gpp.org/ftp/Meetings%5F3GPP%5FSYNC/RAN1/Docs/R1%2D1907290%2Ezip [retrieved on May 13, 2019], Sections 2-8, Sections 1, 6, 8.2 and 8.4..

* cited by examiner

TECHNIQUES FOR CONFIGURING REFERENCE SIGNALS

CROSS-REFERENCE TO RELATED APPLICATION

This application claims benefit of and priority to Greek Patent Application No. 20190100282, filed Jul. 4, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for configuring reference signals.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects provide a method for wireless communication. The method generally includes receiving a control message indicating a first quasi co-location (QCL) for an aperiodic-tracking reference signal (A-TRS), the A-TRS being associated with a periodic-tracking reference signal (P-TRS), determining a second QCL for the P-TRS based on the first QCL for the A-TRS, setting a receive beam for reception of the P-TRS based on the second QCL of the P-TRS, and decoding one or more frames based on channel statistics estimated via the P-TRS received via the receive beam.

Certain aspects provide a method for wireless communication. The method generally includes receiving an indication of a transmission configured indication (TCI) state associated with a control resources set (CORSET), the TCI state indicating an A-TRS, selecting a periodic reference signal to be used for monitoring a signal quality associated with the CORSET, the periodic reference signal being associated with the A-TRS, and monitoring the signal quality of the CORSET based on the selected periodic reference signal.

Certain aspects provide an apparatus for wireless communication. The apparatus generally includes a memory and one or more processors coupled to the memory, the one or more processors and the memory being configured to: receive a control message indicating a first QCL for an A-TRS, the A-TRS being associated with a P-TRS; determine a second QCL for the P-TRS based on the first QCL for the A-TRS; set a receive beam for reception of the P-TRS based on the second QCL of the P-TRS; and decode one or more frames based on channel statistics estimated via the P-TRS received via the receive beam.

Certain aspects provide an apparatus for wireless communication. The apparatus generally includes means for receiving a control message indicating a first QCL for an A-TRS, the A-TRS being associated with a P-TRS; means for determining a second QCL for the P-TRS based on the first QCL for the A-TRS; means for setting a receive beam for reception of the P-TRS based on the second QCL of the P-TRS; and means for decoding one or more frames based on channel statistics estimated via the P-TRS received via the receive beam.

Certain aspects provide for a computer readable medium having computer executable code stored thereon for wireless communication. The computer readable medium generally includes code for receiving a control message indicating a first QCL for an A-TRS, the A-TRS being associated with a P-TRS; code for determining a second QCL for the P-TRS based on the first QCL for the A-TRS; code for setting a receive beam for reception of the P-TRS based on the second QCL of the P-TRS; and code for decoding one or more frames based on channel statistics estimated via the P-TRS received via the receive beam.

Certain aspects provide an apparatus for wireless communication. The apparatus generally includes a memory; and one or more processors coupled to the memory, the one or more processors and the memory being configured to: receive an indication of a TCI state associated with a CORSET, the TCI state indicating an A-TRS; select a periodic reference signal to be used for monitoring a signal quality associated with the CORSET, the periodic reference signal being associated with the A-TRS; and monitor the signal quality of the CORSET based on the selected periodic reference signal.

Certain aspects provide an apparatus for wireless communication. The apparatus generally includes means for receiving an indication of a TCI state associated with a CORSET, the TCI state indicating an A-TRS; means for selecting a periodic reference signal to be used for monitoring a signal quality associated with the CORSET, the periodic reference signal being associated with the A-TRS;

and means for monitoring the signal quality of the CORSET based on the selected periodic reference signal.

Certain aspects provide for a computer readable medium having computer executable code stored thereon for wireless communication. The computer readable medium generally includes code for receiving an indication of a TCI state associated with a CORSET, the TCI state indicating an A-TRS; code for selecting a periodic reference signal to be used for monitoring a signal quality associated with the CORSET, the periodic reference signal being associated with the A-TRS; and code for monitoring the signal quality of the CORSET based on the selected periodic reference signal.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for configuring reference signals. For example, certain aspects are directed to techniques for determining quasi co-location (QCL) associated with tracking reference signal (TRS). For instance, QCL for a periodic-TRS (P-TRS) may be determined based on an associated aperiodic-TRS (A-TRS). Other aspects are directed to techniques for selecting a periodic reference signal (RS) to serve as a radio link failure (RLF) or beam failure detection (BFD) RS. An RLF or BFD RS is used to monitor a signal quality of control signaling (e.g., a control resource set (CORSET)). The RLF/BFD to be used for the monitoring of the signal quality of the CORSET may be selected to be the P-TRS associated with an A-TRS indicated by a transmission configuration indicator (TCI) state, or a reference signal serving as a QCL source of the A-TRS, as described in more detail herein.

The following description provides examples of traffic burst awareness in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
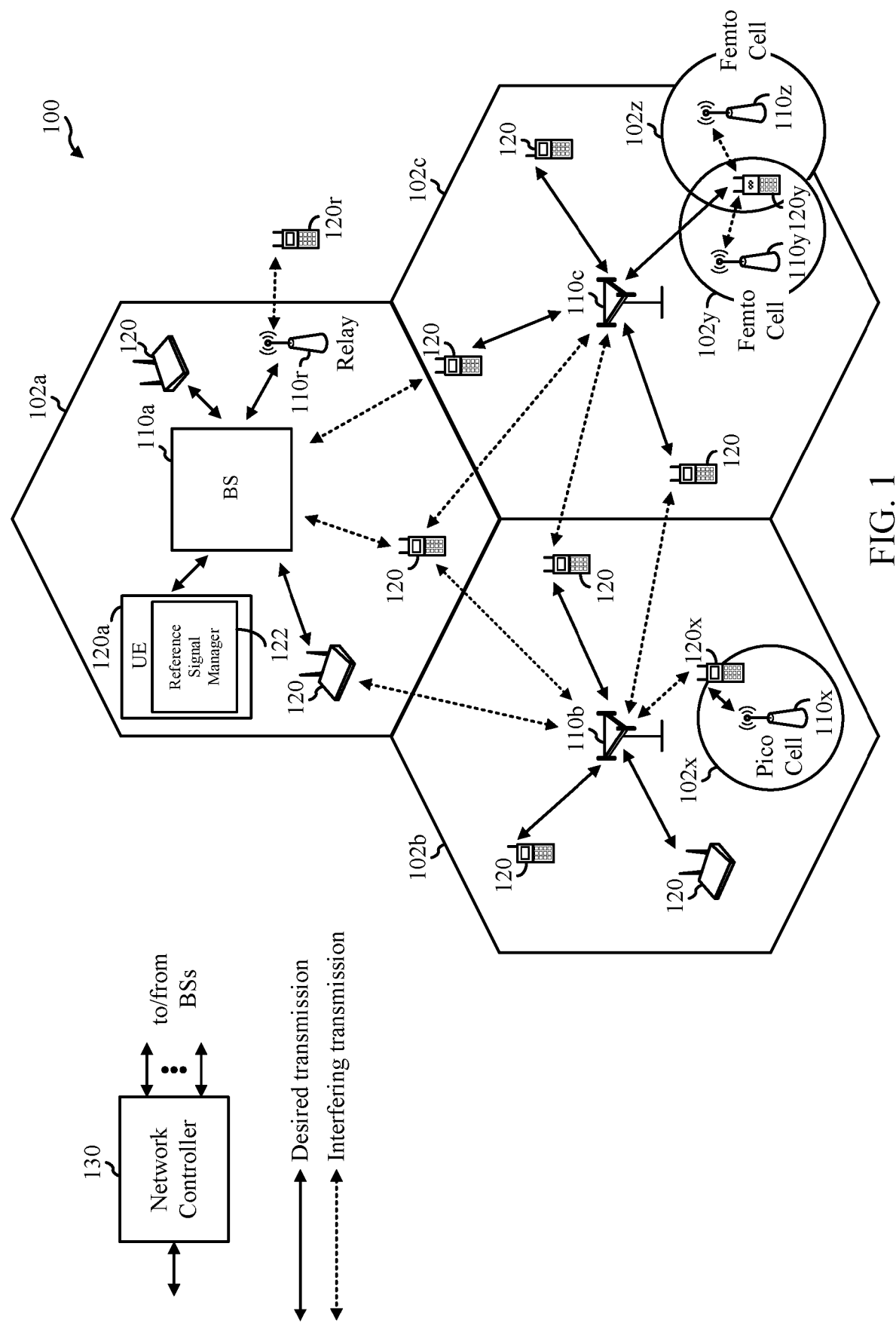
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for configuring reference signals (RSs). As shown in FIG. 1, the UE 120a includes a RS manager 122. The RS manager 122 may be configured to determine QCL for a TRS, or select a periodic signal to serve as a RLF or BFD RS, as described in more detail herein.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
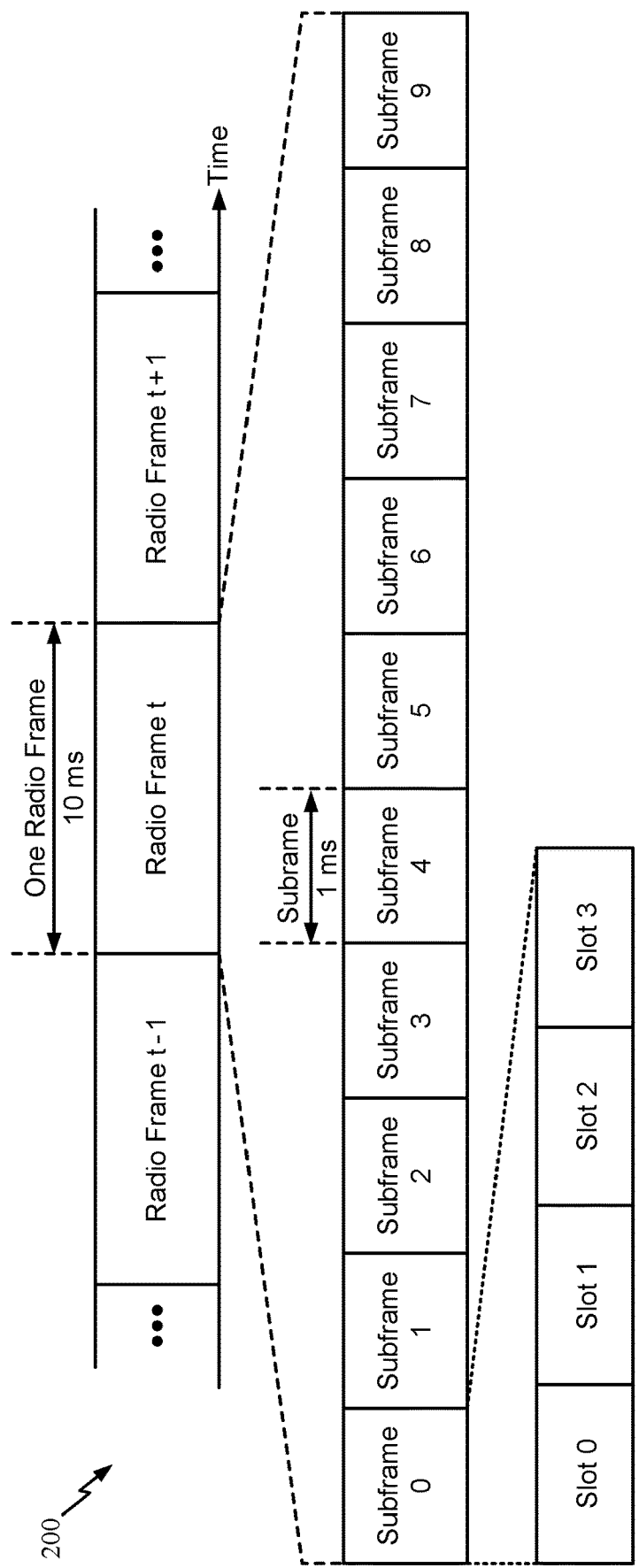
FIG. 2 is a diagram showing an example of a frame format.

FIG. 2 is a diagram showing an example of a frame format 200. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). In certain aspects, a subframe of the frame format 200 may be implemented using cross-carrier scheduling, as described in more detail herein.

Example Techniques for Configuring Reference Signals

Certain aspects of the present disclosure are generally directed to techniques for configuring reference signals (RSs). For example, certain aspects describe techniques for determining a quasi co-location (QCL) associated with tracking reference signal (TRS). QCL generally refers to assumptions that, for a set of signals or channels considered to be QCL related (or simply "QCL'd" for short), certain characteristics derived for (measured from) one of the signals or channels may be applied to the other. As an example, if a downlink (DL) RS is QCL'd with another DL RS, a user equipment (UE) may process the DL RS based on measurements of the other DL RS. In some cases, this may lead to more efficient processing, allowing a UE to use (re-use) previous measurements of the QCL'd RS, which may speed processing of a current channel.

In some cases, QCL assumptions for receptions/transmissions of signals and channels may be signaled via a mechanism referred to as Transmission Configuration Indication (TCI) states. The QCL assumptions may be grouped into different types that correspond to the parameters that may be assumed QCL'd for a set of QCL'd signals. For example, for a set of QCL'd signals, Type A may indicate that Doppler shift, Doppler spread, average delay, delay spread can be assumed QCL'd, while Type B may indicate only Doppler shift and Doppler spread, and Type C may indicate a still different set of parameters. In some cases, spatial QCL assumptions may be indicated, for example, by Type D. Spatial QCL may mean a (Tx or Rx) beam selected based on a certain signal measurement may be applied to the QCL related signal.

A TRS may be used to track and compensate for variations in time and frequency to successfully receive downlink transmissions. In certain implementations, an aperiodic-TRS (A-TRS) may be configured that is associated with a periodic-TRS (P-TRS). To save overhead, a single P-TRS may be reused for (associated with) different downlink (DL) beams. However, when a DL beam used for downlink signaling changes, a radio resource control (RRC) reconfiguration process may be used to change the QCL of the P-TRS accordingly. The RRC reconfiguration process for changing the QCL of the P-TRS results in an increase in latency when switching beams. Therefore, what is needed are apparatus and techniques for updating the QCL of P-TRS with reduced latency.

In certain aspects of the present disclosure, QCL associated with a P-TRS may be determined based on QCL for an associated A-TRS. For example, when the QCL of A-TRS is updated (e.g., by different trigger states), the QCL of associated P-TRS is also implicitly (e.g., automatically) updated, saving additional RRC reconfiguration latency that would otherwise be used to update the QCL for the P-TRS.

Figure 3:
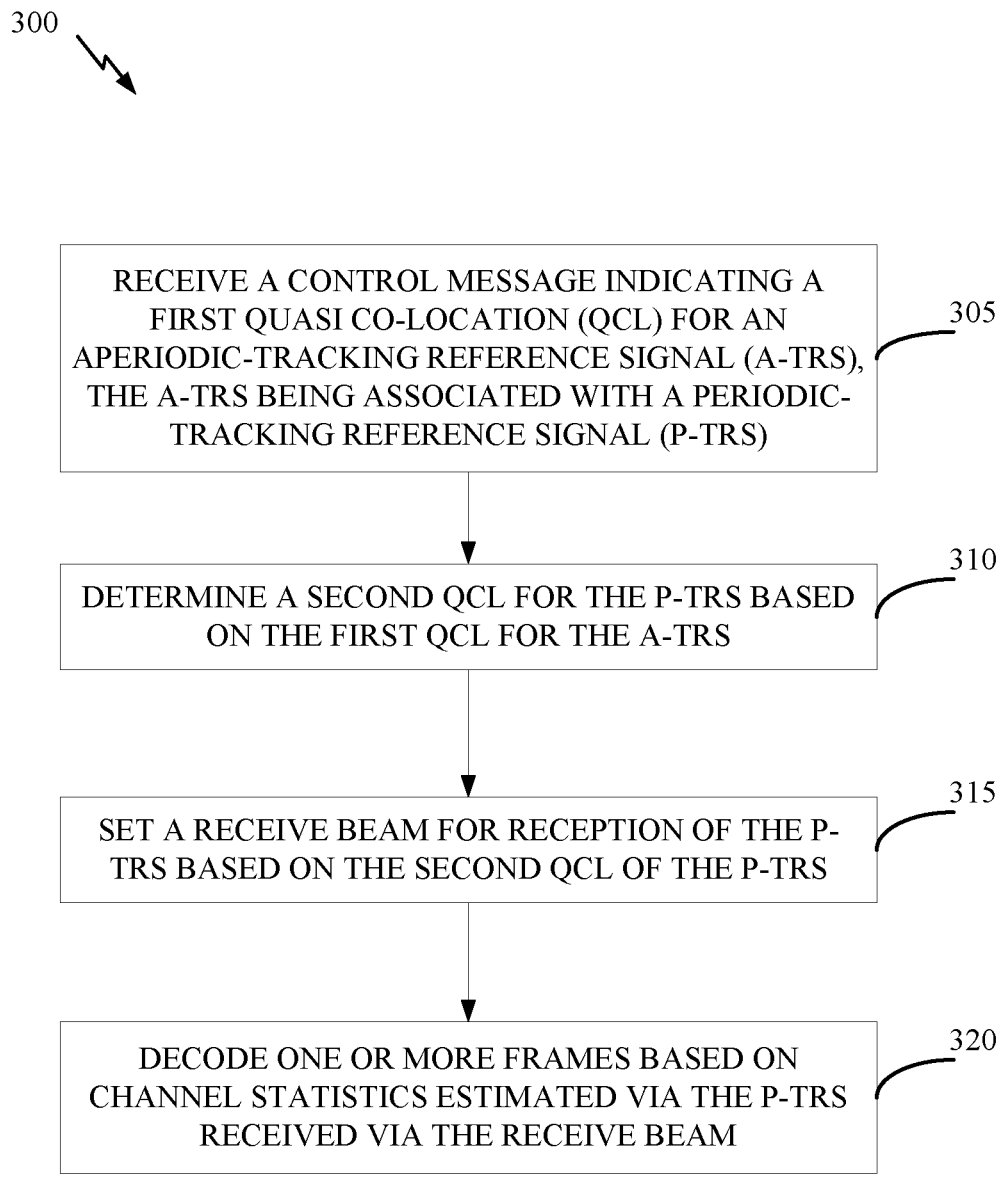
FIG. 3 is a flow diagram illustrating example operations for wireless communication by a user equipment (UE), in accordance with certain aspects of the present disclosure.

FIG. 3 is a flow diagram illustrating example operations 300 for wireless communication, in accordance with certain aspects of the present disclosure. The operations 300 may be performed, for example, by a UE (e.g., such as a UE 120a in the wireless communication network 100).

Figure 8:
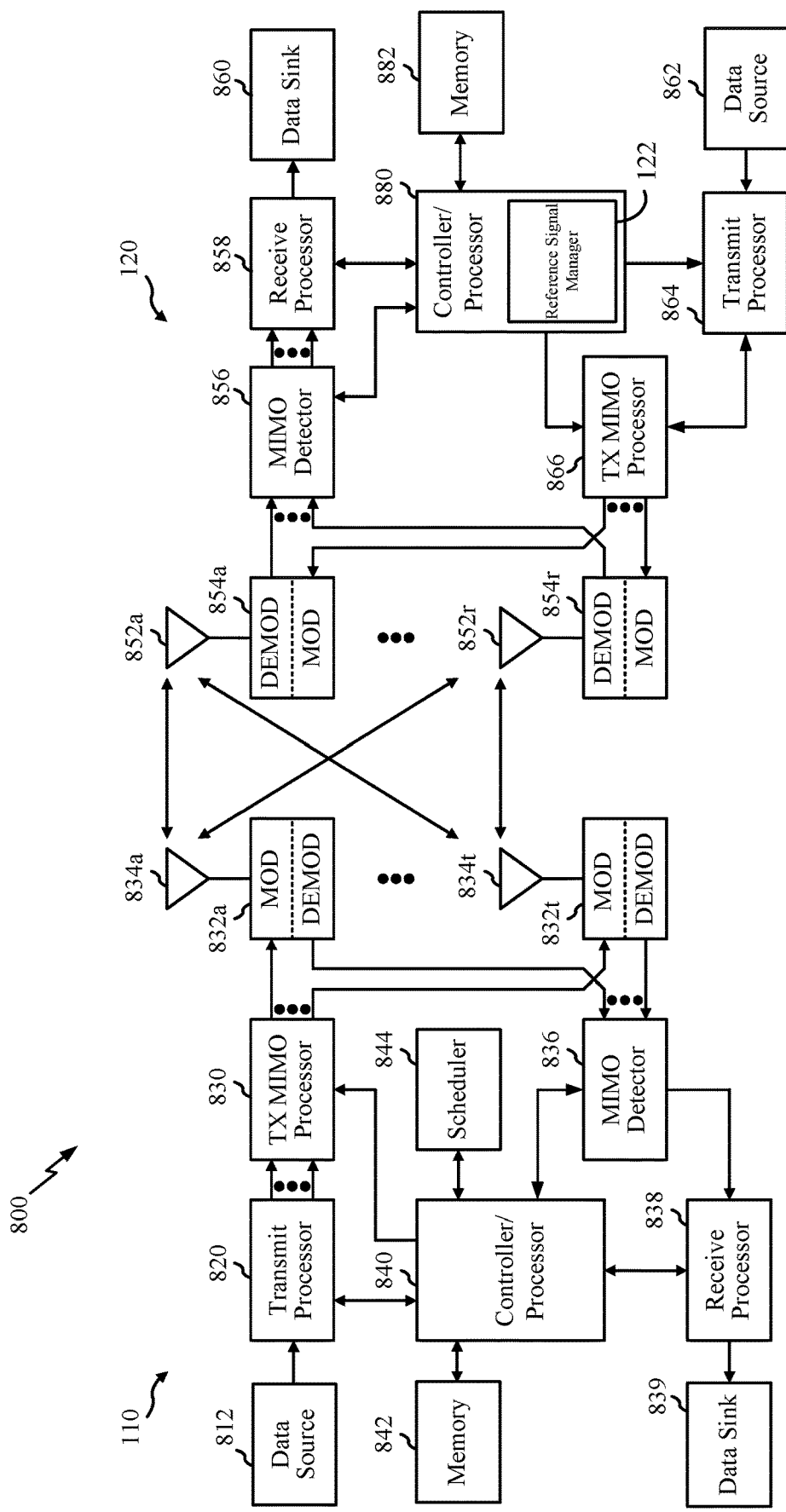
FIG. 8 is a block diagram conceptually illustrating a design of an example base station (BS) and UE, in accordance with certain aspects of the present disclosure.

Operations 300 may be implemented as software components that are executed and run on one or more processors (e.g., controller/processor 880 of FIG. 8). Further, the transmission and reception of signals by the UE in operations 300 may be enabled, for example, by one or more antennas (e.g., antennas 852 of FIG. 8). In certain aspects, the transmission and/or reception of signals by the UE may be implemented via a bus interface of one or more processors (e.g., controller/processor 880) obtaining and/or outputting signals.

The operations 300 may begin at block 305, by the UE receiving a control message indicating a first QCL for an A-TRS, the A-TRS being associated with a P-TRS. At block 310, the UE determines a second QCL for the P-TRS based on the first QCL for the A-TRS. At block 315, the UE may set a receive beam for reception of the P-TRS based on the second QCL of the P-TRS, and at block 320, decode one or more frames based on channel statistics (e.g., Doppler shift, Doppler spread, average delay, delay spread, or any combination thereof) estimated via the P-TRS received via the receive beam. For example, the one or more frames may have the P-TRS as a QCL source (e.g., QCl Type A source and/or QCL-Type D source).

In certain aspects, the first QCL for the A-TRS may include an update of a previously configured QCL for the A-TRS. In certain aspects, the P-TRS may be configured for a plurality of DL beams, as described herein. In this case, the determination of the second QCL for the P-TRS may be in response to a switch from one of the DL beams to another one of the DL beams to be used for receiving the one or more frames. In some cases, the indication of the first QCL for the A-TRS may include an indication of a trigger state.

Figure 4:
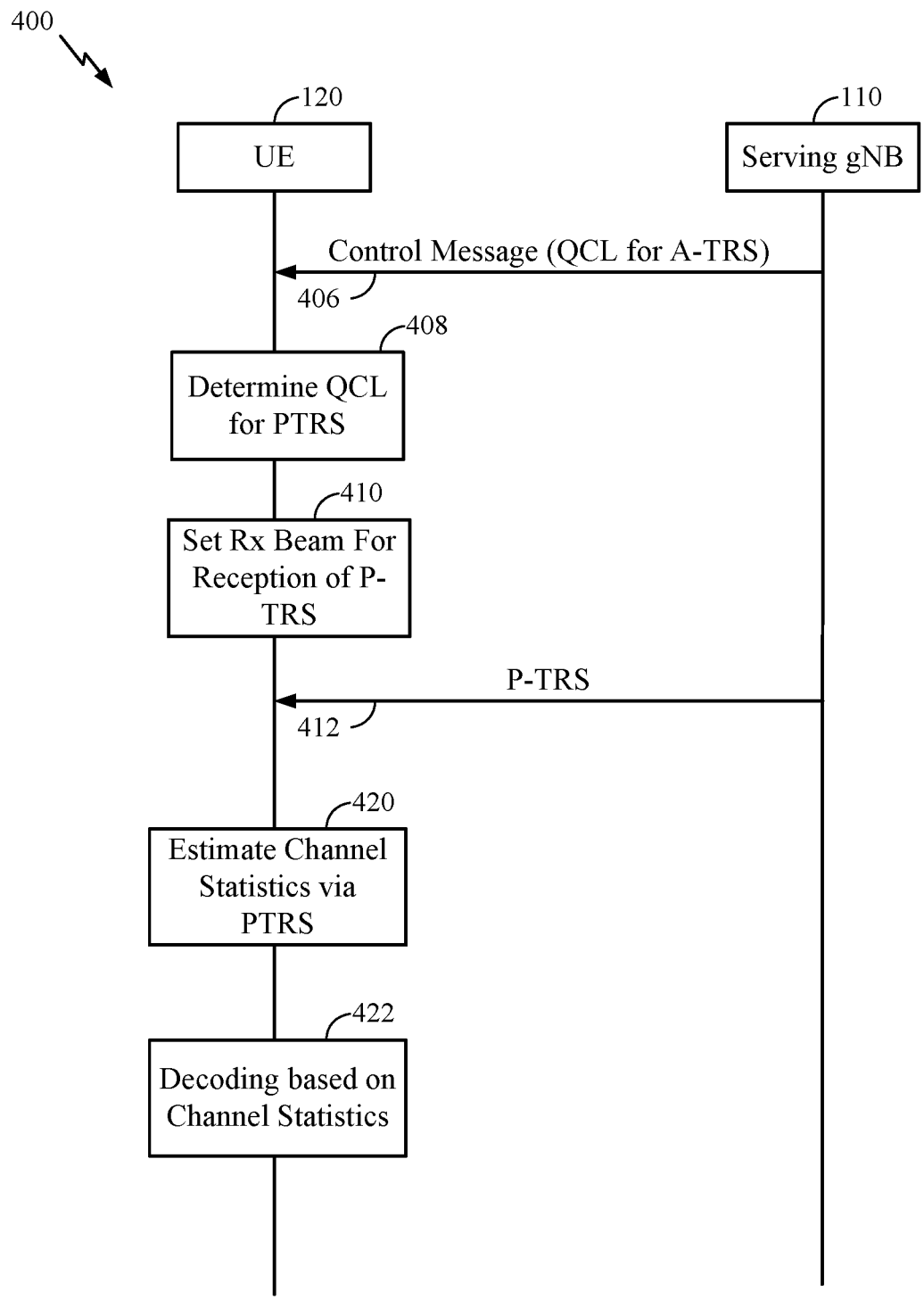
FIG. 4 is a call-flow diagram illustrating example operations for determining quasi co-location (QCL) for a periodic-tracking reference signal (P-TRS), in accordance with certain aspects of the present disclosure.

FIG. 4 is a call-flow diagram illustrating example operations 400 for determining QCL for P-TRS, in accordance with certain aspects of the present disclosure. As illustrated, the UE 120 may receive a control message 406 indicating QCL for A-TRS. At block 408, the UE determines QCL for the P-TRS based on the QCL for the A-TRS indicated via the control message 406. At block 410, the UE may set a receive (Rx) beam for reception of the P-TRS. The Rx beam may be used to receive the P-TRS 412, based on which channel statistics may be estimated, at block 420. At block 422, decoding operations (e.g., decoding of a frame having the P-TRS as a QCL source) may be performed via the channel statistics estimated at block 420.

Certain aspects of the present disclosure are directed to techniques for selecting a periodic RS to serve as a radio link failure (RLF) or beam failure detection (BFD) RS. For example, if a UE is configured with two control resource sets (CORSETS) and both CORSETS fail, a beam failure recovery process (or RLF recovery process) may be triggered. Beam failure detection may be implemented by measuring the signal quality of certain reference signals (also referred to herein as RLF or BFD RS). The RLF/BFD RS may be transmitted periodically using the same beam used to transmit a corresponding CORSET. Therefore, by measuring the quality of the RLF/BFD RS, the signal quality of the CORSET may be estimated.

When implicitly configured, BFD/RLF RS is the periodic RS in the TCI state of each monitored CORESET. The BFD/RLF RS may be the QCL Type-D (spatial receive (Rx) parameter) RS if there is multiple RSs in the TCI state. However, when A-TRS is configured in a TCI state, the A-TRS cannot serve as the implicit BFD/RLF RS. Therefore, the BFD/RLF RS may have to be explicitly configured via an RRC configuration protocol, increasing latency. In certain aspects of the present disclosure, when A-TRS is in the TCI state of a monitored CORESET, the corresponding implicit BFD/RLF RS is the associated P-TRS if an associated P-TRS is configured to the UE, or the periodic RS serving as QCL source of the A-TRS (e.g., synchronization signal block (SSB)/periodic-channel state information-reference signal (P-CSI-RS)). In other words, the RLF/BFD to be used for the monitoring of the signal quality of the CORSET may be selected to be the P-TRS associated with an A-TRS indicated by a TCI state associated with the CORSET or a reference signal (e.g., SSB or CSI-RS) serving as a QCL source of the A-TRS.

Figure 5:
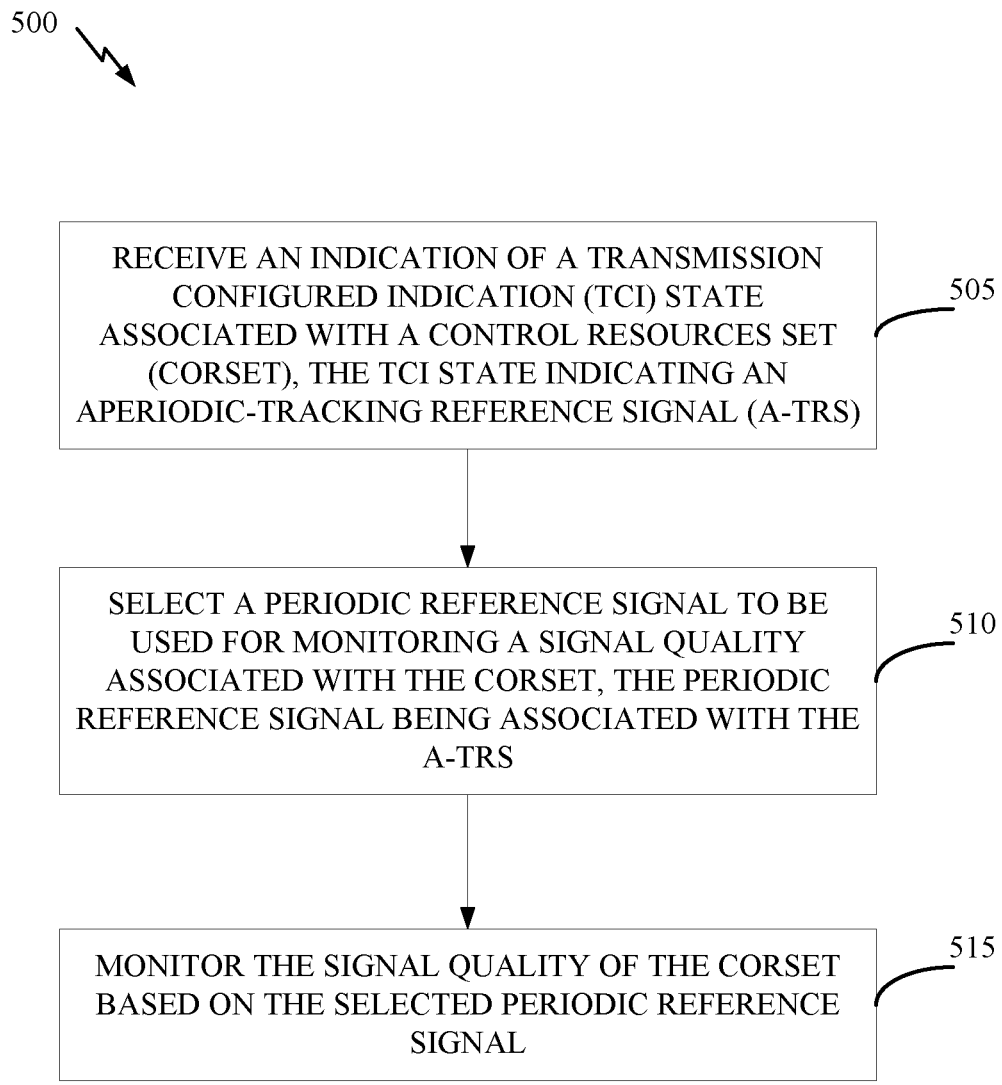
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120a in the wireless communication network 100).

Operations 500 may be implemented as software components that are executed and run on one or more processors (e.g., controller/processor 880 of FIG. 8). Further, the transmission and reception of signals by the UE in operations 500 may be enabled, for example, by one or more antennas (e.g., antennas 852 of FIG. 8). In certain aspects, the transmission and/or reception of signals by the UE may be implemented via a bus interface of one or more processors (e.g., controller/processor 880) obtaining and/or outputting signals.

The operations 500 may begin at block 505, by the UE receiving an indication of a TCI state associated with a CORSET, the TCI state indicating an A-TRS. At block 510, the UE selects a periodic RS to be used for monitoring a signal quality associated with the CORSET, the periodic reference signal being associated with the A-TRS. At block 515, the UE monitors the signal quality of the CORSET based on the selected periodic reference signal. In certain aspects, the periodic reference signal selected to be used for the monitoring of the signal quality may include a P-TRS associated with the A-TRS. In other aspects, the periodic reference signal selected to be used for the monitoring of the signal quality may include a reference signal serving as a QCL source (e.g., QCL-Type D source) of the A-TRS. In some cases, the reference signal serving as the QCL source of the A-TRS may be a SSB or CSI-RS.

Figure 6:
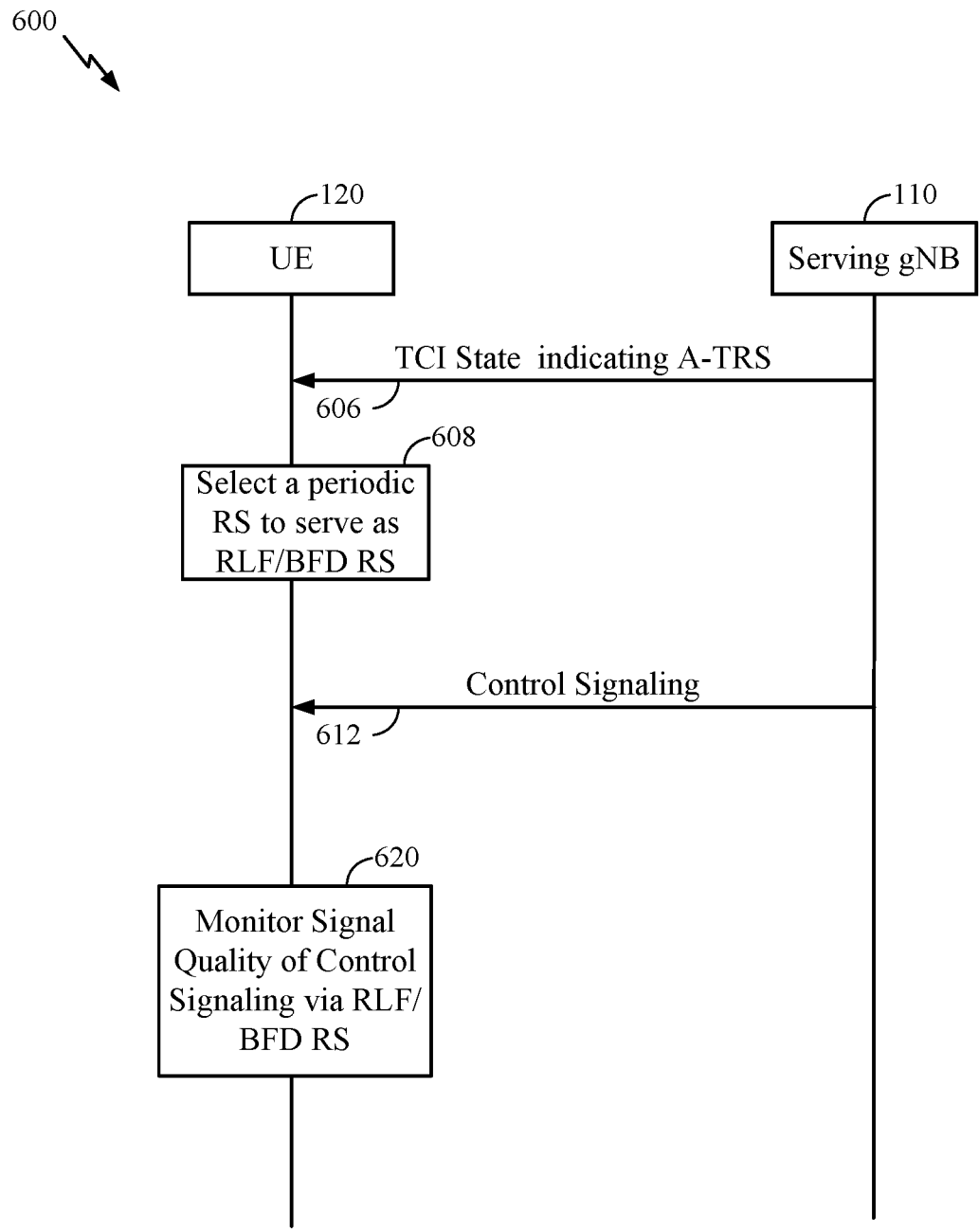
FIG. 6 is a call-flow diagram illustrating example operations for selecting a periodic reference signal (RS) to serve as a radio link failure (RLF) or beam failure detection (BFD) RS, in accordance with certain aspects of the present disclosure.

FIG. 6 is a call-flow diagram illustrating example operations 600 for selecting a periodic RS to serve as an RLF/BFD RS, in accordance with certain aspects of the present disclosure. As illustrated, control signaling 606 may be transmitted to the UE 120 indicating a TCI state associated with a CORSET. The TCI state may indicate (e.g., configure) an aperiodic A-TRS. At block 608, the UE may select a periodic RS to serve as the RLF/BFD RS. For instance, the RLF/BFD to be used for the monitoring of the signal quality of the CORSET may be selected to be the P-TRS associated with the A-TRS or a reference signal (e.g., SSB or CSI-RS) serving as a QCL source of the A-TRS. Control signaling 612 (e.g., CORSET) may be received by the UE including the periodic RS selected to serve as RLF/BFD RS, which may be used to monitor the signal quality of the control signaling at block 620.

Example Aspects

In a first aspect, a method for wireless communication by a user-equipment (UE), comprises: receiving a control message indicating a first quasi co-location (QCL) for an aperiodic-tracking reference signal (A-TRS), the A-TRS being associated with a periodic-tracking reference signal (P-TRS); determining a second QCL for the P-TRS based on the first QCL for the A-TRS; setting a receive beam for reception of the P-TRS based on the second QCL of the P-TRS; and decoding one or more frames based on channel statistics estimated via the P-TRS received via the receive beam.

In a second aspect, in combination with the first aspect, the channel statistics include Doppler shift, Doppler spread, average delay, delay spread, or any combination thereof.

In a third aspect, in combination with one or more of the first aspect and the second aspect, the one or more frames have the P-TRS as a QCL source.

In a fourth aspect, in combination with the third aspect, the QCL source includes a QCL-Type A source or a QCL-Type D source, or both a QCL-Type A source and a QCL-Type D source.

In a fifth aspect, in combination with one or more of the first aspect through the fourth aspect, the first QCL for the A-TRS comprises an update of a previously configured QCL for the A-TRS.

In a sixth aspect, in combination with one or more of the first aspect through the fifth aspect, the P-TRS is configured for a plurality of downlink (DL) beams, wherein the determination of the second QCL for the P-TRS is in response to a switch from one of the DL beams to another one of the DL beams to be used for receiving the P-TRS.

In a seventh aspect, in combination with one or more of the first aspect through the sixth aspect, the indication of the first QCL for the A-TRS comprises an indication of a trigger state.

In an eighth aspect, a method for wireless communication by a UE, comprises: receiving an indication of a transmission configured indication (TCI) state associated with a control resources set (CORSET), the TCI state indicating an A-TRS; selecting a periodic reference signal to be used for monitoring a signal quality associated with the CORSET, the periodic reference signal being associated with the A-TRS; and monitoring the signal quality of the CORSET based on the selected periodic reference signal.

In a ninth aspect, in combination with the eighth aspect, the periodic reference signal selected to be used for the monitoring of the signal quality comprises a P-TRS associated with the A-TRS.

In a tenth aspect, in combination with one or more of the eighth aspect and the ninth aspect, the periodic reference signal selected to be used for the monitoring of the signal quality comprises a reference signal serving as a QCL source of the A-TRS.

In an eleventh aspect, in combination with the tenth aspect, the QCL source at least includes a QCL-Type D source.

In a twelfth aspect, in combination with one or more of the tenth aspect and the eleventh aspect, the reference signal serving as the QCL source of the A-TRS comprises a synchronization signal block (SSB) or channel state information-reference signal (CSI-RS).

In a thirteenth aspect, in combination with one or more of the eighth aspect through the twelfth aspect, the periodic reference signal to be used for the monitoring of the signal quality serves as a radio link failure (RLF) or beam failure detection (BFD) reference signal.

In a fourteenth aspect, an apparatus for wireless communication, comprises: a memory; and one or more processors coupled to the memory, the one or more processors and the memory being configured to: receive a control message indicating a first QCL for an A-TRS, the A-TRS being associated with a P-TRS; determine a second QCL for the P-TRS based on the first QCL for the A-TRS; set a receive beam for reception of the P-TRS based on the second QCL of the P-TRS; and decode one or more frames based on channel statistics estimated via the P-TRS received via the receive beam.

In a fifteenth aspect, in combination with the fourteenth aspect, the channel statistics include Doppler shift, Doppler spread, average delay, delay spread, or any combination thereof.

In a sixteenth aspect, in combination with one or more of the fourteenth aspect and the fifteenth aspect, the one or more frames have the P-TRS as a QCL source.

In a seventeenth aspect, in combination with the sixteenth aspect, the QCL source includes a QCL-Type A source or a QCL-Type D source, or both a QCL-Type A source and a QCL-Type D source.

In an eighteenth aspect, in combination with the fourteen aspect through the seventeenth aspect, the first QCL for the A-TRS comprises an update of a previously configured QCL for the A-TRS.

In a nineteenth aspect, in combination with the fourteen aspect through the eighteenth aspect, the P-TRS is configured for a plurality of DL beams, wherein the determination of the second QCL for the P-TRS is in response to a switch from one of the DL beams to another one of the DL beams to be used for receiving the P-TRS.

In a twentieth aspect, in combination with the fourteen aspect through the nineteenth aspect, the indication of the first QCL for the A-TRS comprises an indication of a trigger state.

In a twenty-first aspect, an apparatus for wireless communication, comprises: a memory; and one or more processors coupled to the memory, the one or more processors and the memory being configured to: receive an indication of a TCI state associated with a CORSET, the TCI state indicating an A-TRS; select a periodic reference signal to be used for monitoring a signal quality associated with the CORSET, the periodic reference signal being associated with the A-TRS; and monitor the signal quality of the CORSET based on the selected periodic reference signal.

In a twenty-second aspect, in combination with the twenty-first aspect, the periodic reference signal selected to be used for the monitoring of the signal quality comprises a P-TRS associated with the A-TRS.

In a twenty-third aspect, in combination with one or more of the twenty-first aspect and the twenty-second aspect, the periodic reference signal selected to be used for the monitoring of the signal quality comprises a reference signal serving as a QCL source of the A-TRS.

In a twenty-fourth aspect, in combination with the twenty-third aspect, the QCL source at least includes a QCL-Type D source.

In a twenty-fifth aspect, in combination with one or more of the twenty-third aspect and the twenty-fourth, the reference signal serving as the QCL source of the A-TRS comprises a SSB or CSI-RS.

In a twenty-sixth aspect, in combination with the twenty-fifth aspect, the periodic reference signal to be used for the monitoring of the signal quality serves as a RLF or BFD reference signal.

In a twenty-seventh aspect, an apparatus for wireless communication includes a processor, memory coupled with the processor, the processor and memory configured to perform a method of any one of the first aspect to the thirteenth aspect.

In a twenty-eighth aspect, an apparatus for wireless communication includes at least one means for performing a method of any one of the first aspect to the thirteenth aspect.

In a twenty-ninth aspect, a non-transitory computer-readable medium storing code for wireless communication includes a processor, memory coupled with the processor, and instructions stored in the memory and executable by the processor to cause the apparatus to perform a method of any one of the first aspect to the thirteenth aspect.

Figure 7:
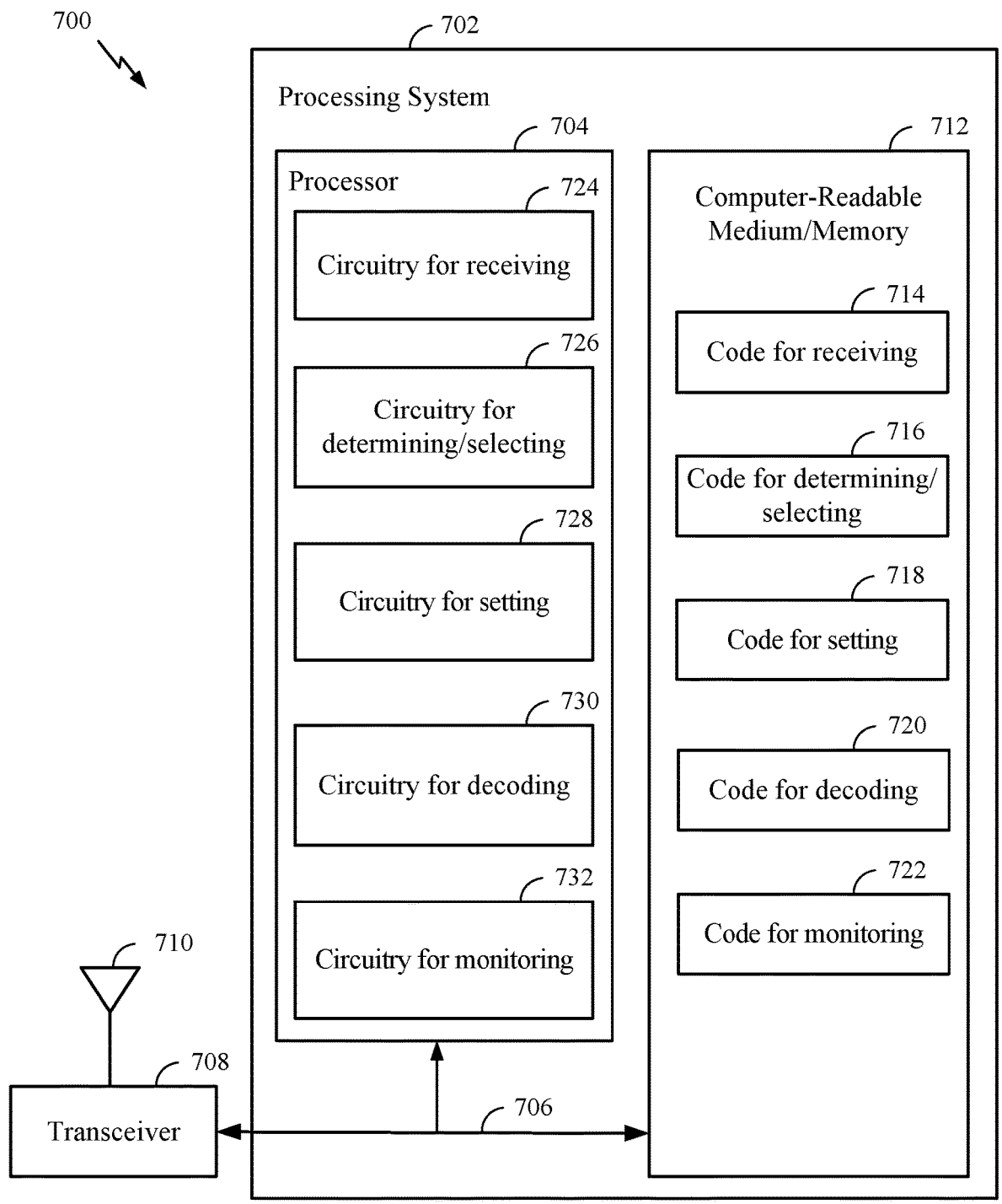
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIGS. 3 and 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIGS. 3 and 5, or other operations for performing the various techniques discussed herein for configuring reference signals. In certain aspects, computer-readable medium/memory 712 stores code 714 for receiving; code 716 for determining and selecting, code 718 for setting, code 720 for decoding, and code 722 for monitoring. In certain aspects, the processor 704 has circuitry configured to implement the code stored in the computer-readable medium/memory 712. The processor 704 includes circuitry 724 for receiving; circuitry 726 for determining and selecting, circuitry 728 for setting, circuitry 730 for decoding, and circuitry 732 for monitoring.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

FIG. 8 illustrates example components 800 of BS 110a and UE 120a (e.g., in the wireless communication network 100 of FIG. 1), which may be used to implement aspects of the present disclosure.

At the BS 110a, a transmit processor 820 may receive data from a data source 812 and control information from a controller/processor 840. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 820 may process (e.g., encode and symbol map) the data and control information to obtain data symbols and control symbols, respectively. The transmit processor 820 may also generate reference symbols, such as for the primary synchronization signal (PSS), secondary synchronization signal (SSS), and cell-specific reference signal (CRS). A transmit (TX) multiple-input multiple-output (MIMO) processor 830 may perform spatial processing (e.g., precoding) on the data symbols, the control symbols, and/or the reference symbols, if applicable, and may provide output symbol streams to the modulators (MODs) 832a-832t. Each modulator 832 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 832a-832t may be transmitted via the antennas 834a-834t, respectively.

At the UE 120a, the antennas 852a-852r may receive the downlink signals from the BS 110a and may provide received signals to the demodulators (DEMODs) in transceivers 854a-854r, respectively. Each demodulator 854 may condition (e.g., filter, amplify, downconvert, and digitize) a respective received signal to obtain input samples. Each demodulator may further process the input samples (e.g., for OFDM, etc.) to obtain received symbols. A MIMO detector 856 may obtain received symbols from all the demodulators 854a-854r, perform MIMO detection on the received symbols if applicable, and provide detected symbols. A receive processor 858 may process (e.g., demodulate, deinterleave, and decode) the detected symbols, provide decoded data for the UE 120a to a data sink 860, and provide decoded control information to a controller/processor 880.

On the uplink, at UE 120a, a transmit processor 864 may receive and process data (e.g., for the physical uplink shared channel (PUSCH)) from a data source 862 and control information (e.g., for the physical uplink control channel (PUCCH) from the controller/processor 880. The transmit processor 864 may also generate reference symbols for a reference signal (e.g., for the sounding reference signal (SRS)). The symbols from the transmit processor 864 may be precoded by a TX MIMO processor 866 if applicable, further processed by the demodulators in transceivers 854a-854r (e.g., for SC-FDM, etc.), and transmitted to the BS 110a. At the BS 110a, the uplink signals from the UE 120a may be received by the antennas 834, processed by the modulators 832, detected by a MIMO detector 836 if applicable, and further processed by a receive processor 838 to obtain decoded data and control information sent by the UE 120a. The receive processor 838 may provide the decoded data to a data sink 839 and the decoded control information to the controller/processor 840.

The memories 842 and 882 may store data and program codes for BS 110a and UE 120a, respectively. A scheduler 844 may schedule UEs for data transmission on the downlink and/or uplink.

The controller/processor 880 and/or other processors and modules at the UE 120a may perform or direct the execution of processes for the techniques described herein. As shown in FIG. 8, the controller/processor 880 of the UE 120a has a RS manager 122 that may be configured to determine QCL for a TRS, or select a periodic signal to serve as a RLF or BFD RS, as described in more detail herein. Although shown at the Controller/Processor, other components of the UE 120a may be used performing the operations described herein.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
receiving a control message indicating a first quasi co-location (QCL) for an aperiodic-tracking reference signal (A-TRS), the A-TRS being associated with a periodic-tracking reference signal (P-TRS);
determining a second QCL for the P-TRS based on the first QCL for the A-TRS;
setting a receive beam for reception of the P-TRS based on the second QCL of the P-TRS; and
decoding one or more frames based on channel statistics estimated via the P-TRS received via the receive beam.

2. The method of claim 1, wherein the channel statistics include Doppler shift, Doppler spread, average delay, delay spread, or any combination thereof.

3. The method of claim 1, wherein the one or more frames have the P-TRS as a QCL source.

4. The method of claim 3, wherein the QCL source includes a QCL-Type A source or a QCL-Type D source, or both a QCL-Type A source and a QCL-Type D source.

5. The method of claim 1 wherein the first QCL for the A-TRS comprises an update of a previously configured QCL for the A-TRS.

6. The method of claim 1, wherein the P-TRS is configured for a plurality of downlink (DL) beams, wherein the determination of the second QCL for the P-TRS is in response to a switch from one of the DL beams to another one of the DL beams to be used for receiving the P-TRS.

7. The method claim 1, wherein the indication of the first QCL for the A-TRS comprises an indication of a trigger state.

8. A method for wireless communication by a user-equipment (UE), comprising:
receiving an indication of a transmission configured indication (TCI) state associated with a control resources set (CORSET), the TCI state indicating an aperiodic-tracking reference signal (A-TRS);
selecting a periodic reference signal to be used for monitoring a signal quality associated with the CORSET, the periodic reference signal being associated with the A-TRS; and
monitoring the signal quality of the CORSET based on the selected periodic reference signal.

9. The method of claim 8, wherein the periodic reference signal selected to be used for the monitoring of the signal quality comprises a periodic-tracking reference signal (P-TRS) associated with the A-TRS.

10. The method of claim 8, wherein the periodic reference signal selected to be used for the monitoring of the signal quality comprises a reference signal serving as a quasi co-location (QCL) source of the A-TRS.

11. The method of claim 10, wherein the QCL source at least includes a QCL-Type D source.

12. The method of claim 10, wherein the reference signal serving as the QCL source of the A-TRS comprises a synchronization signal block (SSB) or channel state information-reference signal (CSI-RS).

13. The method of claim 8, wherein the periodic reference signal to be used for the monitoring of the signal quality serves as a radio link failure (RLF) or beam failure detection (BFD) reference signal.

14. An apparatus for wireless communication, comprising:
   a memory; and
   one or more processors coupled to the memory, the one or more processors and the memory being configured to:
      receive a control message indicating a first quasi co-location (QCL) for an aperiodic-tracking reference signal (A-TRS), the A-TRS being associated with a periodic-tracking reference signal (P-TRS);
      determine a second QCL for the P-TRS based on the first QCL for the A-TRS;
      set a receive beam for reception of the P-TRS based on the second QCL of the P-TRS; and
      decode one or more frames based on channel statistics estimated via the P-TRS received via the receive beam.

15. The apparatus of claim 14, wherein the channel statistics include Doppler shift, Doppler spread, average delay, delay spread, or any combination thereof.

16. The apparatus of claim 14, wherein the one or more frames have the P-TRS as a QCL source.

17. The apparatus of claim 16, wherein the QCL source includes a QCL-Type A source or a QCL-Type D source, or both a QCL-Type A source and a QCL-Type D source.

18. The apparatus of claim 14, wherein the first QCL for the A-TRS comprises an update of a previously configured QCL for the A-TRS.

19. The apparatus of claim 14, wherein the P-TRS is configured for a plurality of downlink (DL) beams, wherein the determination of the second QCL for the P-TRS is in response to a switch from one of the DL beams to another one of the DL beams to be used for receiving the P-TRS.

20. The apparatus of claim 14, wherein the indication of the first QCL for the A-TRS comprises an indication of a trigger state.

21. An apparatus for wireless communication, comprising:
   a memory; and
   one or more processors coupled to the memory, the one or more processors and the memory being configured to:
      receive an indication of a transmission configured indication (TCI) state associated with a control resources set (CORSET), the TCI state indicating an aperiodic-tracking reference signal (A-TRS);
      select a periodic reference signal to be used for monitoring a signal quality associated with the CORSET, the periodic reference signal being associated with the A-TRS; and
      monitor the signal quality of the CORSET based on the selected periodic reference signal.

22. The apparatus of claim 21, wherein the periodic reference signal selected to be used for the monitoring of the signal quality comprises a periodic-tracking reference signal (P-TRS) associated with the A-TRS.

23. The apparatus of claim 21, wherein the periodic reference signal selected to be used for the monitoring of the signal quality comprises a reference signal serving as a quasi co-location (QCL) source of the A-TRS.

24. The apparatus of claim 23, wherein the QCL source at least includes a QCL-Type D source.

25. The apparatus of claim 23, wherein the reference signal serving as the QCL source of the A-TRS comprises a synchronization signal block (SSB) or channel state information-reference signal (CSI-RS).

26. The apparatus of claim 25, wherein the periodic reference signal to be used for the monitoring of the signal quality serves as a radio link failure (RLF) or beam failure detection (BFD) reference signal.

* * * * *